United States Patent [19]

McIntosh et al.

[11] Patent Number: 4,471,552
[45] Date of Patent: Sep. 18, 1984

[54] FISH AGGREGATING SYSTEM

[76] Inventors: Gregory McIntosh, 621 Idlewyld Dr., Fort Lauderdale, Fla. 33301; Richard G. Iossi, 3010 Sabastian St., Fort Lauderdale, Fla. 33304

[21] Appl. No.: 352,306

[22] Filed: Feb. 25, 1982

[51] Int. Cl.³ ............... A01K 91/00; A01K 85/01; A01K 71/00

[52] U.S. Cl. .......................... 43/4; 43/17.1; 43/17.5; 43/4.5

[58] Field of Search ............. 43/4, 4.5, 17.1, 17.5, 43/42.31; 119/2, 3; 114/293, 294, 300

[56] References Cited

U.S. PATENT DOCUMENTS

| | | | |
|---|---|---|---|
| 3,111,926 | 11/1963 | Shatto | 114/293 |
| 3,683,356 | 8/1972 | D'Amore | 43/17.1 |
| 3,879,697 | 4/1975 | Richard | 43/17.1 X |
| 3,885,338 | 5/1975 | York | 43/17.1 |
| 3,909,973 | 10/1975 | Fairbanks | 43/17.1 X |
| 4,366,641 | 1/1983 | Price et al. | 43/54.1 |

OTHER PUBLICATIONS

*The Efficacy of Midwater Artifical Structure on Attracting Pelagil Coastal Fish,* Trans. Amer. Fish Soc. 1973, No. 3, pp. 563-566, by Donald A. Wickham, John W. Watson, and Larry Ogren.
*Attraction of Coastal Pelagic Fishes with Artifical Structures,* Transactions of the American Fisheries Society, vol. 100, No. 1 1971, pp. 86-99, by Edwad F. Klima and Donald A. Wickham.
*Anchored Fish Aggregating Devices in Hawaiian Waters,* Sep. 1981 by Walter M. Matsumoto, Thomas K. Kayama, and Donald C. Aasted.

*Primary Examiner*—Nicholas P. Godici
*Assistant Examiner*—M. Jordan
*Attorney, Agent, or Firm*—Malin, Haley & McHale

[57] ABSTRACT

A fish aggregating system for deployment in bodies of water for recruitment of fish for commercial and sport harvesting. The fish aggregating system utilizes various methods for attracting fish and the system may be configured for use under various meteorological and oceanographic conditions. The fish aggregating system may be utilized in an anchored or floating mode.

9 Claims, 3 Drawing Figures

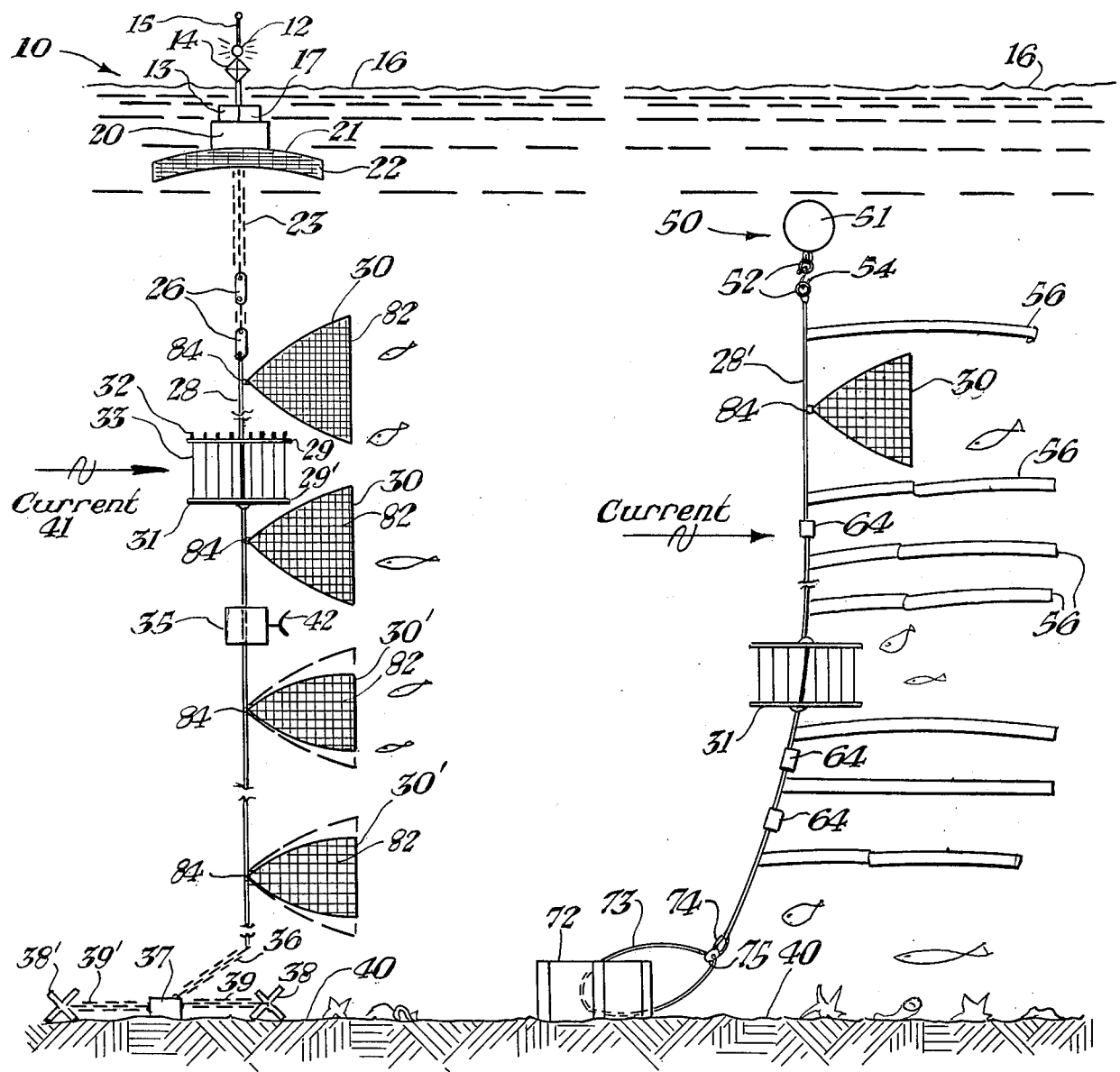
Fig. 1.
Fig. 2.
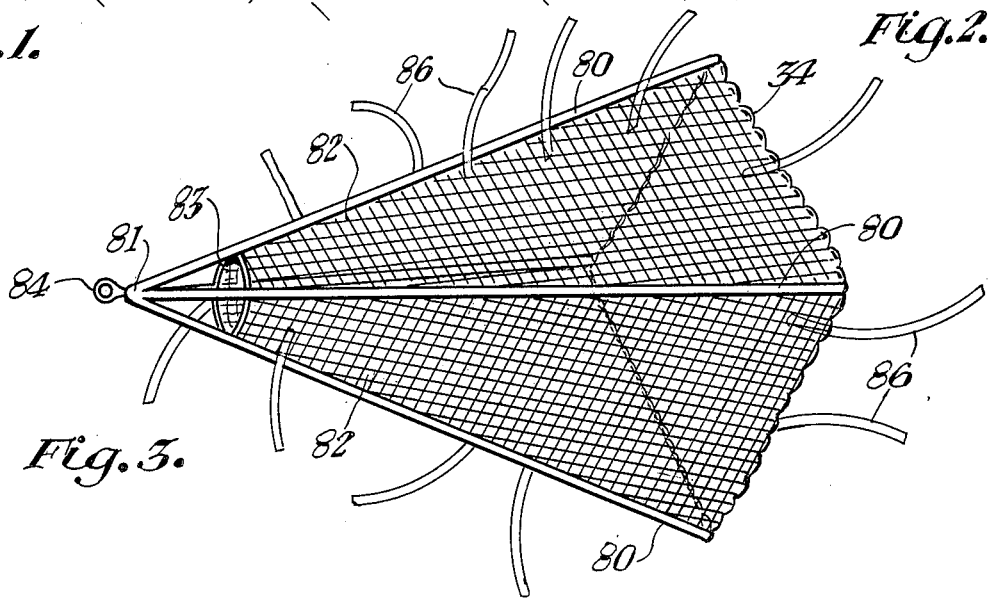
Fig. 3.

FISH AGGREGATING SYSTEM

BACKGROUND OF THE INVENTION

The instant invention pertains to the use of simple and complex structures submerged at the surface and at mid water level to attract and aggregate fish. Commercial fishermen in many parts of the world have learned to harvest pelagic fishes that exhibit the tendency to congregate around floating objects such as rafts, logs and other fixed structures. Various studies have been conducted in this area such as: "Attraction of Coastal Pelagic Fishes with Artificial Structures" by Edward S. Klima and Donald A. Witcam, Transactions of the American Fisheries Society, Volume 100, No. 1, January 1971, pp. 86–99; "Association of Fishes with Flotsom in the Off Shore Waters of Central America", John R. Hunter, and Charles T. Mitchell, Fishery Bulletin, Volume 66, No. 1, pp. 13–29; "Anchored Fish Aggregating Devices in Hawaiian Waters", Walter M. Matsumoto, Thomas K. Kazama, and Donald C. Aasted, Marine Fisheries Review, September 1981, pp. 1–13; and "Fields Experiments on the Attraction of Pelagic Fish to Floating Objects", John R. Hunter and Charles T. Mitchell, Bureau of Commercial Fisheries Tuna Resources Laboratory, LaJolla, Calif. "Ecological Significance of a Drifting Object to Pelagic Fishes", Reginald M. Gooding and John Magnuson, Pacific Science, Vol. VVI, No. 4, October 1967, pp. 486–497. The publications are attached to this disclosure and are made a part of it by reference and incorporation.

Research has shown that coastal pelagic fish (i.e., sardines) form aggregations around various structures where they can be harvested with nets. Research has been directed toward determining the feasibility of utilizing submerged artificial objects so that fish can be concentrated in sufficient quantity in the vicinity of these underwater structures in preselected areas so that they could be harvested with various conventional gear. These studies have been conducted in such various areas as the Gulf of Mexico off of the State of Florida, the off shore waters of Costa Rica and the off shore waters of the Hawaiian islands.

Evaluations of artificial floating objects have revealed that more pelagic fish were attracted to three-dimensional structures, than to horizontal or vertical plane surfaces.

The most striking features of these studies are that large quantity of fish associated with the structures throughout the study and that the structures were effective in attracting fish. In one study by Kalima and Wickhman their data showed more than 10,000 fish were estimated to be around each structure. In the Klima and Wickham study data demonstrated that various species had different attraction tendencies to simple and complex structures and their position in the water column.

The Kalima and Wickhman study proported to support the concept that some species may associate with objects in the water as a result of species-specific behavioral mechanisms. The observations of the fish schools could also be explained by schooling companion mechanism. Kilma and Wickhman proposed that floating objects and underwater structures provide spatial references around which fishes can orient in the otherwise unstructured pelagic environment. They further stated that regardless of the mechanism involved the evidence increasingly indicated that the initial attraction is probably the result of a visual stimulus provided by structure in the optical void of the pelagic environment.

The rate of initial attracting was very rapid, indicating the fish could be harvested at frequent intervals. Attraction appeared to be dependent upon the visibility of the structure. A structure's vertical position had some effect on the number of fish attracted. The results of these studies indicate that artificial structures could accumulate coastal pelagic species, a technique that could be incorporated into a commercial harvesting system for this undeveloped aquatic resource.

BRIEF DESCRIPTION OF THE INVENTION

The instant invention relates to a fish aggregating system for placement in a body of water for recruitment of large numbers of fish to a specific location or area for sport or commercial harvesting. The instant invention relies upon the demonstrated tendency of certain species of fish to aggregate in large numbers in the vicinity of underwater anchored structures and floating structures resembling flotsam. The configuration of the fish aggregating device may be varied according to the water depth, species of fish desired, condition of ocean bottom, speed of any current, surface waves and wind conditions and other local meteorological and oceanographic environmental conditons.

In one embodiment of the instant invention a surface buoy provides floatation support for a planar, two dimensional, fish attracting device deployed near the surface of the water to resemble flotsam. A mesh-netting material is attached to the planar fish attracting device to create a horizontally disposed raft-like flotsam. The planar device is normally submerged within the first 20 feet of water depth. Extending from the surface buoy is a mast supporting a signaling device powered by a battery utilizing a light or radio transmitting beacon, a radar reflector or other similar signaling device to aid in the location of the surface buoy. The surface buoy is connected to additional subsurface buoys at the mid-water level by a chain. The subsurface buoys are then connected to the tether line which extends downward to an anchor assembly on the ocean bottom. Mid-water level is considered to be approximately 50 feet below the surface.

Other various fish attracting devices constructed to resemble three dimensional structures are then attached to the tether line at various water depths to take advantage of the tendency of certain species of fish to be attracted to such structures. One such three dimensional fish attracting device is constructed of three or more flexible rods connected at a common apex to form a pyramid shape structure. The apex is connected to the tether line for support and allows stream lining in a current. The water pressure of the current will compress the size of the pyramid structure to reduce the stress on the tether line and the structure itself. Another fish attracting device is an elongated streamer attached to the tether line. The streamer is generally thin and lightweight which allows it to undulate in the water in response to the slightest current or water movement. This streamer provides stationary positioned visual stimulus to the fish. In addition to two dimensional and three dimensional fish attracting devices other sound-producing or sound-transmitting devices may be used to enhance the fish attracting capability of the fish aggregating device. One such sound-producing device is constructed by the utilization of numerous wire strings interconnected under tension between two generally parallel struts attached perpendicularly to the tether line. The tension on the strings may be adjusted by well-known string tightening devices so that the flow of water past the strings caused by a current may produce one or more vibrations, frequencies or harmonic tones which have been found to attract fish. An alternate method of attracting fish by sound is to place on the fish aggregating device a player device and an underwater speaker for transmitting a recording of sounds and frequencies which have been found to attract fish. Because of the remote location of the fish aggregating device it is necessary to power this sound transmitting unit by a battery source. This embodiment of the fish aggregating device may be augmented with an acoustical sonar device attached to the surface buoy for maintaining surveillance of the area beneath the surface of the water in the vicinity of the fish aggregating device to monitor the rate of recruitment of fish to the device and to qualify and quantify the resultant bio-mass data thereby identifying the number and species of fish present. This would prove beneficial to determine when the optimum time to harvest occurs. This information could be transmitted by addition of an appropriate radio transmitter. In an alternative embodiment of this fish aggregating device it does not utilize an anchoring assembly but floats about freely in the open ocean. An alternative embodiment of this invention utilizes an anchoring assembly as set forth below.

Different anchoring devices are disclosed by the instant invention to insure maintenance of the fish aggregating device at a specific location and to prevent chaffing of the tether line on the ocean bottom which could result in the severing of the tether line and the loss of the fish aggregating device. The cluster anchor assembly utilized the concept of several individual anchors located separate and apart but joined at a single junction point for attachment to the tether line. Various heavy large objects such as concrete blocks and metal objects such as vehicle engines may be utilized to create these individual anchor components. In this manner a heavy anchor assembly is created without relying upon a single enormous structure. A single chain may be used to connect the cluster anchor assembly junction point to the tether line so that the tether line is not exposed to chaffing by contact with the ocean bottom as the fish aggregating device drifts about the cluster anchor assembly. An alternate anchor assembly relies upon one or more large structures, such as concrete blocks to provide the weight necessary for anchoring the fish aggregating device. In this embodiment a large cable loop is inserted around or through the numerous stationery objects to interconnect them and provide connection with the tether line. This anchor extension allows numerous objects to be interconnected and by varying the length of the anchor extension the depth of the fish aggregating device may be adjusted. In order to avoid chaffing of the tether line against the anchor extension an eyelet is situated at the end of the tether line and is connected to the anchor extension by an insulating loop. The interconnecting loop formed by the anchor extension, the insulator and the eyelet allow the tether line to slide freely along the length of the anchor extension.

In the alternative embodiment of the fish aggregating device a single floatation buoy is located approximately fifty feet below the surface of the water at the mid-water level in order to conceal the location of the fish aggregating device, and to avoid the stress of the surface wave coupling effect. This will also prevent this embodiment of the fish aggregating device from constituting a hazard to vessels which may pass in its vicinity. In order to locate this fish aggregating device it would be necessary for the fisherman to be able to pinpoint this specific location on the ocean by such means as a loran navigating system.

The above fish aggregating devices may be deployed as single units or in groups to achieve a desired result with regard to recruitment of fish to them. The capability of the fish aggregating device can be tailored by the utilization of the various fish attracting devices, floatation devices and anchoring assemblies.

It is an object of this invention to provide an improved fish aggregating device which may be configured to utilize several different fish attracting devices and fish attracting sound devices.

It is another objective of this invention to provide an anchoring system which prevents movement of the fish aggregating device and prevents chaffing of the tether line.

In still yet another objective of this invention is to provide signalling apparatus so that the fish aggregating device may be readily located on the open ocean.

It is another objective of this invention to provide a fail safe connection for disconnect release of the tether line from the floatation buoy in the event that the fish aggregating device breaks loose from its anchoring assembly.

Yet still another objective is to provide a fish aggregating device floatation buoy system which will be able to withstand the stress of the wave action surface coupling effect.

Still another objective is to provide an underwater surveillance system on the fish aggregating device to monitor and transmit information concerning the quantity and quality of fish recruitment.

It is an objective of this invention to provide a three-dimensional, pyramid shaped fish attracting device which will compress under water pressure of a current to reduce the stress by the device on the tether line.

It is an objective of this invention to provide a fish aggregating device utilizing components of minimum required strength while achieving long term survival in the hostile environment of the ocean.

In accordance with these and other objectives which will be apparent hereinafter, the instant invention will now be described with particular reference to the accompanying drawings.

BRIEF DESCRIPTION OF THE DRAWINGS

FIG. 1 shows a side elevational view of the instant invention.

FIG. 2 shows a side elevational view of an alternate embodiment of the instant invention.

FIG. 3 shows a prospective view of the three-dimensional pyramid shaped fish attracting device utilized in the instant invention.

PREFERRED EMBODIMENT OF THE INVENTION

Referring now to the drawings, and specifically FIG. 1, one embodiment of the instant invention is shown generally as 10. Beacon 12 and radar reflector 14 are connected to the distal end of vertically disposed mast 18 and supported above water surface 16 by surface buoy 20 at a sufficient height to facilitate visual or radar locating of the device on the open sea. In an alternative embodiment additional equipment such as an accoustical sonar device 17 could be added to provide surveillance of the area in the vicinity of device 10 to allow monitoring of the rates of recruitment of fish, and the type and quantity of fish. The addition of radio transmitter 13, antenna 15 and a battery power source (not shown) will allow the transmission of the above information to the fisherman to allow harvesting of the fish aggregating device 10 at the most productive periods of time. Beacon 12 may be powered by a battery pack (not shown). Surface buoy 20 and subsurface buoy 26 are floatation devices constructed of buoyant material such as drums filled with non-compressable foam to provide floatation support. Chain 23 connects the surface buoy 20 to a plurality of subsurface buoy 26 at a mid-water level of approximately the fifty foot depth. The surface buoy 20 is usually submerged approximately twenty feet below water surface 16 to prevent entanglement with vessels which may be approaching the fish aggregating device 10. Subsurface buoy 26 provides additional floatation support to the other components of the fish aggregating device. By placement at the mid-water level buoy 26 avoids the damaging water action coupling effect near the surface. The primary responsibility of buoy 20 is to support the components attached directly to it and planar fish attractor 22.

Planar fish attractor 22 is a generally planar two-dimensional structure generally horizontally disposed in proximity to water surface 16 and provided floatation support by surface buoy 20. The length and width of aggregator 22 are horizontally disposed and may be of any shape to provide a frame on which to support a mesh netting 21 of a synthetic material. All materials utilized in construction of the instant invention are selected for their resistance to corrosion and disintegration by long term emersion in salt and fresh water environments. Attachment of the mesh netting 21 to attractor 22 provides a horizontally disposed raft-like flotsam environment. Short elongated streamers (not shown) generally no longer than sixty (60) inches may be attached to the mesh netting to enhance the flotsam appearance. Tether line 28 attaches to subsurface buoy 26 and connects to anchor chain 36 to provide an attachment and support facility for various fish attracting devices. Anchor chain 36 connects to joint connection 37 where the numerous stationery objects 38 and 38' are interconnected by chains 39 and 39' to form the cluster anchor system resting on ocean bottom 40. The fish attracting device 30 (also shown in FIG. 3) is attached to tether line 28 at connecting point 84 at various depths along tether line 28. Fish attracting device 30 is a three-dimensional structure shaped like a pyramid with triangular sides. Shown at 32 is fish attracting device 30 in its compressed configuration as a result of the water pressure of current 41. Mesh netting 82 (as shown in FIG. 3) provides a flotage effect for the fish attracting device 30. One or more sound producing device 31 or sound transmitting device 35 may be attached to tether line 28 to enhance the fish attracting capability of the fish aggregating device 10. Sound-producing device 31 is formed by interconnecting a plurality of string 33 between two generally parallel struts 29 and 29' under tension. Strut 29 and 29' are attached to tether line 28 a fixed distance apart. A plurality of string adjusting device 32 are provided along strut 29 to adjust the tension on each string 33 to produce a single, multiple or harmonic sound and frequency. As current 41 flows past the plurality of string 33 a fish attracting frequency and sound is created by the resulting vibration. In an alternative embodiment of fish aggregating device 50 sound transmitting device 35 is attached to tether line 28 and includes an underwater speaker 42, a well-known sound playing device (not shown) and a battery source (not shown). Through underwater speaker 42 sound transmitting device 35 emits one or more fish attracting frequencies to complement the fish attracting capabilities of the fish aggregating device 10.

Referring now to FIG. 2, an alternative embodiment of the instant invention is shown generally at 50. A subsurface buoy 51 provides floatation support for the tether line at the mid-water level. Two eyelets 52 are connected to the floatation buoy 51 and tether line 28'. An S-shaped connector 54 interconnects the two eyelet 52 by the upper and lower loops of the S-shaped connector 54 encircling each eyelet 52. The upper and lower hook of the connector 54 do not completely encircle eyelet 52 and therefore there is a slight gap to allow disconnection between floatation buoy 51 and tether line 28' during the rocking effect caused by wave action coupling on the surface 16. In the event that tether line 28' is separated from stationery anchor 72 floatation buoy 51 would cause fish aggregating device 50 to rise towards the water surface 16 supported by floatation buoy 51 thereby constituting a hazard to navigation. Continuous surface wave coupling effect in the vicinity of water surface 16 will eventually allow either hooked end of connector 54 to slip out of either release eyelet 52. At that time the plurality of weight 64 connected to tether line 28' and the weight of the other components of fish aggregating device 50 would cause it to sink to the bottom 40 thereby eliminating the danger to shipping and navigation. A plurality of fish attractor streamer 56 are attached to tether line 28' to create a flotage effect to attract fish. Even the slightest water current or motion will cause streamer 56 to undulate. The movement of such streamer 56 has been found to attract fish. In an alternative embodiment of fish aggregating device 50 to enhance the fish attraction capability of fish aggregator 50 fish attracting device 30, sound-producing fish attracting device 31 and sound-transmitting fish attracting device 35 (not shown) may be utilized in various configurations. Tether line 28' is connected to eyelet 74. Insulator 75 connects eyelet 74 and anchor extension 73 to prevent chaffing of tether line 28' against the bottom 40. Anchor extension 73 encircles stationery anchor 72 and may be installed in various lengths to adjust the depth of floatation buoy 51 and the deployment of fish aggregating device 50.

Referring now to FIG. 3, fish attracting device 30 is shown. Fish attracting device 30 is constructed of three or more flexible rod 80 which are connected at apex 81 to form a generally three-dimensional, pyramid-shaped structure, with triangular sides. Flexible rod 80 will bend inward upon exertion of water pressure upon it and mesh netting 82 by current 41. This bending of the flexible rod 80 will result in fish attracting device 30 being compressed in size reducing the surface area exposed to current 41. This compression of fish attracting device 30 reduces the pressure exerted by fish attraction device 30 on tether line 28 and 28' at connector 84. When the force of current 41 is reduced rod 80 is biased to flex back to its original pyramid shape. Connector 84 is pivotally attached to tether line 28' to allow it to reposition with a change in direction of current 41. Preselecting the flexibility of rod 81 allows for designing the compression of attracting device 30 to function in any anticipated current force. Mesh netting 82 will be attached to the outer surface of the plurality of flexible rod 80 to give the structure a flotage and undulating effect. The distal end of the pyramid shaped fish attracting device 30 will generally not be covered, providing an opening in the structure to allow the free flow of water and reduction drag in the current 41. At the proximal end of attracting device 30 near the apex there may be provided an opening 83 to allow the free flow of water along the longitudinal axis of the attractor device 30 and to reduce drag in the current 41. A plurality of short streamers 86 may be attached to the mesh netting 82 to increase the flotage and undulating effect.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A fish attractor for use with a fish aggregating device for recruiting fish to a pre-selected location in a body of water having a current associated therewith, said attractor comprising:
   buoy means for providing floutation support;
   a tether line connected to said buoy means; and
   a three dimensional structure formed with a plurality of flexible rods, the proximal end of each of which is connected together at a single apex and the distal end of each of which is unconnected, a covering connected to the flexible rods; and
   means for connecting said apex to said teather line beneath the surface of said body of water;
   said flexible rods being selected to be bent inward as a result of force exerted by water current, whereby said structure is compressed in size and streamlined in response to said water current.

2. The invention according to claim 1, wherein;
   said covering is connected to said flexible rods from a point remote from said apex to said the distal end thereof to allow the free flow of water through said structure.

3. The invention according to claim 1, wherein said means for connecting said apex freely rotates around said teather line.

4. A fish attractor for use with a fish aggregating device for recruiting fish to a pre-selected location in a body of water having a current associated therewith, said attractor comprising;
   buoy means for providing floatation support;
   a teather line connected to said buoy means; and
   sound producing means attached to said teather line including string means connected under tension between two struts, said tension being adjustable to produce a fish attracting sound as said string means vibrates as water flows past said string means.

5. The invention according to claim 4, further comprising;
   means for adjusting the tension on said string means so that multiple frequency sounds are produced.

6. The invention according to claim 4, further comprising;
   a three dimensional structure formed with a plurality of flexible rods, the proximal end of each of which is connected together at a single apex and the distal end of each of which is unconnected, a cover connected to the flexible rods and means for connecting said apex to said teather line attached beneath the surface of said body of water;
   said flexible rods being selected to be bent inward as a result of force exerted by water current, whereby said structure is compressed in size and streamlined in response to said water current.

7. The invention according to claim 6, wherein;
   said cover is connected to said flexible rods from a point remote from said apex to said the distal end thereof to allow the free flow of water through said structure.

8. The invention according to claim 7, further comprising;
   means for adjusting the tension on said string means so that multiple frequency sounds are produced.

9. The invention according to claim 6 wherein said means for connecting said apex freely rotates around said teather line.

* * * * *